(12) United States Patent
Thompson et al.

(10) Patent No.: US 10,609,780 B2
(45) Date of Patent: Mar. 31, 2020

(54) WIRELESS LUMINAIRE CONTROLLER AND METHOD OF USE

(71) Applicant: California Eastern Laboratories, Inc., Santa Clara, CA (US)

(72) Inventors: Aren M. Thompson, Lake Zurich, IL (US); Erik J. Davidson, Broomfield, CO (US); David Parrett, Louisville, CO (US); David E. Wilde, Markesan, WI (US)

(73) Assignee: California Eastern Laboratories, Inc., Santa Clara, CA (US)

( * ) Notice: Subject to any disclaimer, the term of this patent is extended or adjusted under 35 U.S.C. 154(b) by 0 days.

(21) Appl. No.: 16/525,664

(22) Filed: Jul. 30, 2019

(65) Prior Publication Data

US 2020/0037411 A1    Jan. 30, 2020

Related U.S. Application Data

(63) Continuation-in-part of application No. 16/257,257, filed on Jan. 25, 2019, which is a continuation of application No. 16/046,259, filed on Jul. 26, 2018, now Pat. No. 10,314,132.

(60) Provisional application No. 62/725,943, filed on Aug. 31, 2018.

(51) Int. Cl.
H05B 33/08    (2006.01)
H05B 37/02    (2006.01)

(52) U.S. Cl.
CPC ..... *H05B 33/0857* (2013.01); *H05B 33/0827* (2013.01); *H05B 37/0272* (2013.01)

(58) Field of Classification Search
None
See application file for complete search history.

(56) References Cited

U.S. PATENT DOCUMENTS

2011/0187275 A1\* 8/2011 Giltaca .............. H05B 37/0218
                                                              315/159
2018/0315567 A1\* 11/2018 Goettle .............. H05B 37/0272

\* cited by examiner

*Primary Examiner* — Dedei K Hammond
(74) *Attorney, Agent, or Firm* — Richard W. James

(57) ABSTRACT

An apparatus and method for retrofitting a wired luminaire to wireless control. The method includes coupling a sensor and the luminaire to the controller by wire and further includes controlling a separate memory device, a radio, a relay for switching power to a luminaire, a zero to ten-volt luminaire control output, and a hardware switch with a single microcontroller.

20 Claims, 6 Drawing Sheets

WIRELESS LUMINAIRE CONTROLLER AND METHOD OF USE

CROSS-REFERENCE TO RELATED APPLICATIONS

The present application is a continuation-in-part of U.S. patent application Ser. No. 16/257,257, filed Jan. 25, 2019, which is incorporated herein in its entirety, and claims priority to U.S. provisional patent application Ser. No. 62/725,943 filed Aug. 31, 2018.

FIELD OF THE INVENTION

This invention is related to luminaire control, and more particularly to apparatuses and methods for sensing an ambient condition and controlling power to, intensity of and/or color temperature of a luminaire.

BACKGROUND OF THE INVENTION

A variety of devices are available for sensing ambient conditions related to lighting and there are also a variety of devices for controlling operation of luminaires.

Types of luminaires including LED luminaires, fluorescent luminaires, incandescent luminaires, and halogen luminaires, for example.

Types of signals used to control the intensity of luminaires and the color temperature of tunable white light LED luminaires can include a binary power on/off control, a 0-10V dimming control signal, a 0-10V light color control signal, and a Digital Addressable Lighting Interface (DALI) control signal to communicate energization, intensity, and color of a luminaire, for example. Apparatuses also exist for pulse-width-modulated (PWM) signal interfaces, phase-cut dimming, and for implementing a radio for wireless connectivity and control of the luminaire.

Types of signals that may be useful in the control of luminaire operation include lighting brightness or luminous intensity sensors, motion sensors, and manually operated switches and dimming controls.

There are also systems of computer nodes intercommunicating to automate the operation of luminaires.

There is, however a need for a single device to sense one or more ambient conditions and control luminaires.

There is also a need for a retrofit luminaire control device that can be hardwired to one or more sensors and hardwired to control a luminaire, while communicating wirelessly on a wireless network.

There is also a need for a wireless control device that has persistence such that when that device is not communicating on a wireless network that device will continue to control its load in accordance with control rules stored on the wireless control device and one or more sensed values received by wire from one or more sensors.

BRIEF DESCRIPTION OF THE DRAWINGS

The accompanying drawings, wherein like reference numerals are employed to designate like components, are included to provide a further understanding of wireless luminaire control apparatuses and methods, are incorporated in and constitute a part of this specification, and show embodiments of those apparatuses and methods that together with the description serve to explain those apparatuses and methods.

Various other objects, features and advantages of the invention will be readily apparent according to the following description exemplified by the drawings, which are shown by way of example only, wherein.

SUMMARY OF THE INVENTION

Figure 1:
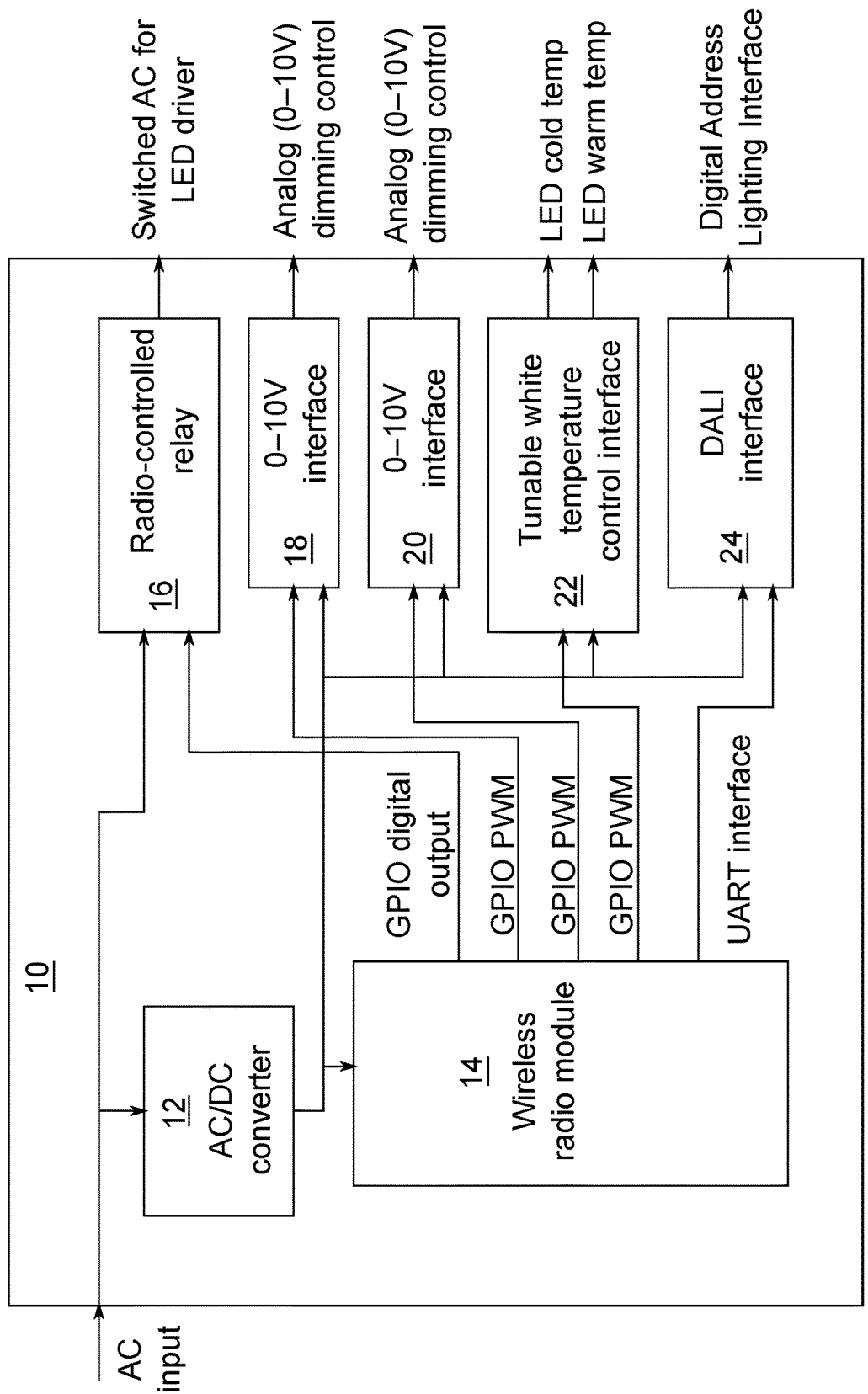
FIG. 1 illustrates a block diagram of an embodiment of a wireless luminaire controller.

In an embodiment, a wireless luminaire control device includes a single microcontroller, a separate memory device, a radio, a relay, a first microcontroller pulse width modulated output coupled to a first zero to ten-volt driver, first and second inputs, and a hardware switch. The separate memory device is coupled to the single microcontroller and contains instructions for operation of the single microcontroller. The radio is for communication with one or more remote nodes on a wireless network. The relay is for hardwired luminaire power switching. The first microcontroller pulse width modulated output coupled to a first zero to ten-volt driver interface provides a first control signal to be hardwired to control the luminaire. The first input is for reception of a hardwired occupancy signal from an occupancy sensor. The second input is for reception of a hardwired ambient light signal from an ambient light sensor. The hardware switch causes the single microcontroller to execute instructions to join a wireless network when the hardware switch is actuated. The single microcontroller has a processor that includes instructions which, when executed by the processor, cause the processor to control at least one of the relay and the first control signal based on at least one of the first input and the second input, the control also based on control rules stored in the processor.

In another embodiment, a wireless control device includes a single microcontroller, a separate memory device, a radio, a relay, a first microcontroller pulse width modulated output coupled to a first zero to ten-volt driver interface, first and second inputs, and a hardware switch. The separate memory device is coupled to the single microcontroller and contains instructions for operation of the single microcontroller. The radio is coupled to the single microcontroller for communication with another node on a wireless network. The relay is coupled to the single microcontroller for switching power for a load. The first microcontroller pulse width modulated output is coupled to a first zero to ten-volt driver interface to provide a first control signal for the load. The first microcontroller input is to receive a first signal from a sensor and the second microcontroller input is to receive a second signal from one of the sensor and a second sensor. The hardware switch is coupled to the single microcontroller and causes the single microcontroller to execute instructions to join a wireless network when the hardware switch is actuated. The single microcontroller has a processor that includes instructions which, when executed by the processor, cause the processor to control at least one of the relay and the first control signal based on at least one of the first input and the second input, the control also based on control rules stored in the processor.

A method of controlling a wireless control is also provided. That method is for a wireless control that has a separate memory device, a radio, a relay for switching power to a load, a zero to ten-volt control output, a hardware switch, an occupancy input, and an ambient light input with a single microcontroller. That method includes the separate memory device downloading operational instructions to the single microcontroller when the single microcontroller and separate memory are energized. That method also includes the radio receiving a control signal from a remote wireless luminaire control device. In that method, the relay switches to provide hardwired power to the luminaire and the zero to ten-volt control output provides a first control signal to be hardwired to the luminaire. Also in that method the occupancy input receives a hardwired occupancy signal from the sensor and the ambient light input receives a hardwired ambient light signal from the sensor. In that method, the hardware switch causes the single microcontroller to execute instructions to join a wireless network when the hardware switch is actuated. The wireless control of that method controls at least one of the relay and the first control signal based on at least one of the occupancy input and the ambient light input and also controls based on control rules stored in the separate memory device and executed by the single microcontroller.

Other embodiments, which may include one or more parts of the aforementioned apparatus and method or other parts, are also contemplated, and may have a broader or different scope than the aforementioned apparatus and method. For example, some microcontrollers may be able to generate many PWM signals which can then be used to create additional 0-10V control signals. Thus, the embodiments in this Summary of the Invention are mere examples, and are not intended to limit or define the scope of the invention or claims.

DETAILED DESCRIPTION

Reference will now be made to embodiments of wireless luminaire control apparatuses and methods of using a wireless luminaire control, examples of which are shown in the accompanying drawings. Details, features, and advantages of wireless luminaire control apparatuses and methods of use will become further apparent in the following detailed description of embodiments thereof.

Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification do not necessarily all refer to the same embodiment. References to "or" are furthermore intended as inclusive, so "or" may indicate one or another of the ored terms or more than one ored term.

FIG. 1 is a block diagram of an embodiment of a wireless luminaire control 10. The wireless luminaire controller 10 includes an AC/DC converter 12, a wireless radio 14, a relay 16, a first channel interface 18, a second channel interface 20, a tunable white temperature control interface 22, and a digital lighting control protocol interface 24.

The wireless luminaire control 10 AC/DC alternating current to direct current converter 12 may be coupled to alternating current line electrical power to receive power and may convert that line power and output direct current electrical power to the wireless radio 14, the relay 16, the first channel interface 18, which may provide a first 0-10V output signal, the second channel interface 20, which may provide a second 0-10V output signal, the tunable white temperature control interface 22 that controls an LED color or what is commonly referred to as "temperature" control output, and the digital lighting control protocol interface 24.

The AC/DC converter 12 can be any of many devices available to convert alternating current, such as 120 VAC operating at 60 Hz or 230 VAC operating at 50 Hz to a direct current appropriate for powering the wireless radio 14, relay 16, first interface 18, second interface 20, tunable white temperature control interface 22, and digital address lighting interface 24. The implementation of the AC/DC converter 12 can be a self-contained component or made up of discrete components to achieve the conversion from AC to DC as required.

The AC/DC converter may be coupled to a building power supply and may generate approximately a 3.3 VDC output to be provided to certain components 14, 16, and 22 of the wireless luminaire control 10 and approximately 12-16 VDC for other components, such as the 0-10V interfaces 18, 20 and the DALI interface 24. The AC/DC converter may alternately provide different output voltages as desired.

Figure 3:
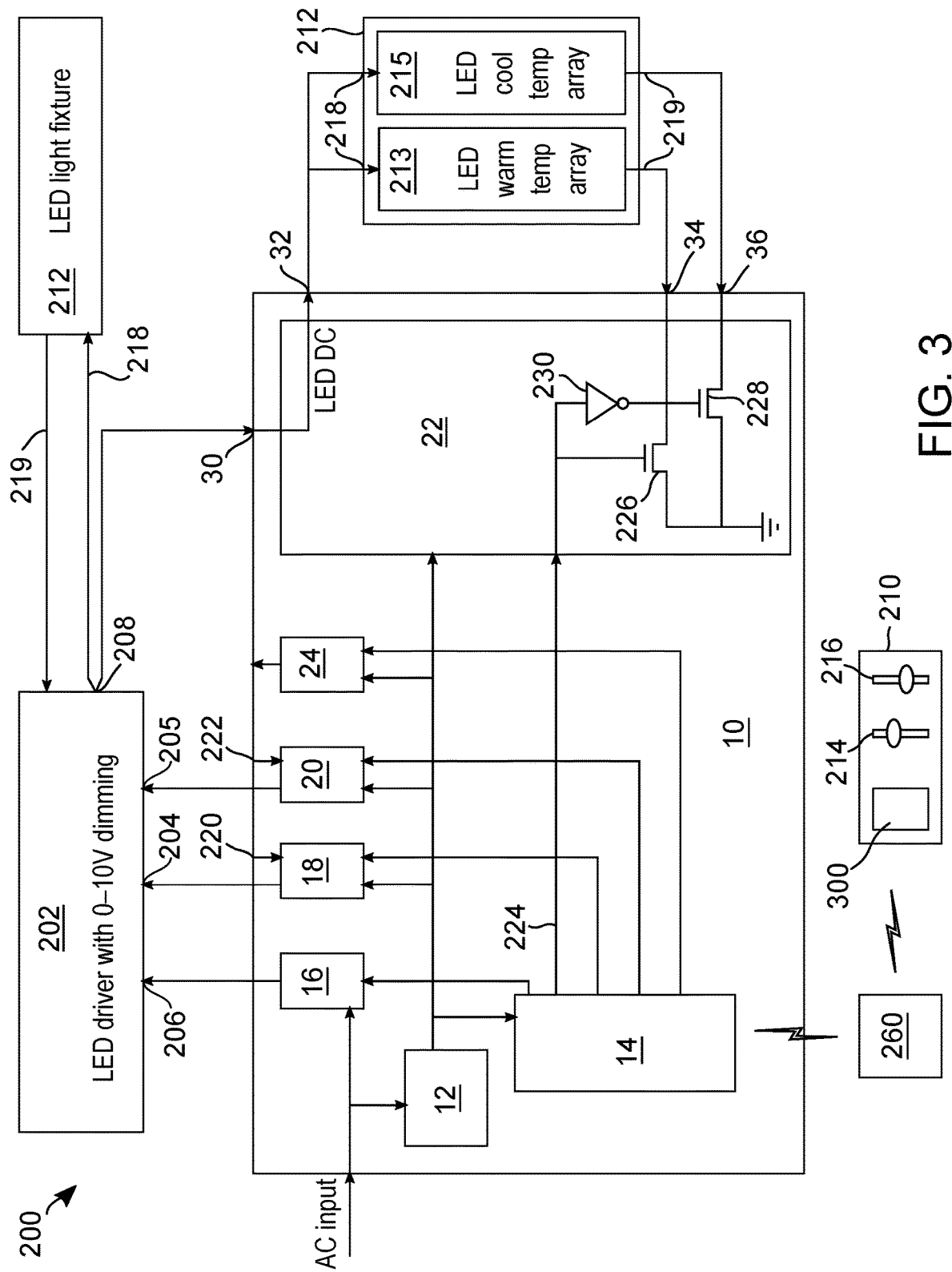
FIG. 3 illustrates an embodiment of an LED luminaire installation.

The wireless radio 14 receives and transmits wireless control information, for example, using an IEEE 802.11 WiFi, Bluetooth, Zigbee, or proprietary 802.15.4 protocol. The wireless radio 14 of one network node (i.e., 210) may transmit information, such as lighting status, level, and color information to another network node (i.e., 10) coupled to an LED light fixture 212 and that transmission may occur through a gateway to a driver 202 that provides an appropriate signal or direct current to operate the LED light fixture 212 as is illustrated in FIG. 3. The wireless radio 14 may also or alternately transmit or receive information to another device. For example, the wireless radio 14 may receive luminaire control information from a user interface which may, for example, be a computing device or a manually actuated device such as the dimmer 214. Those transmissions may furthermore occur through the gateway 260. The wireless radio 14 may also or alternately receive information or instructions from the gateway 260 or another device coupled to the network 256 and those instructions may provide information regarding how the LED fixture 212 is to be controlled.

The wireless radio 14 may, for example, be a Cortet® model ZICM357SPx or ZICM3588SPx MeshConnect™ RF module and may include a radio transceiver with a baseband modem to manage radio functions, a microcontroller with internal RAM and flash memory, and a hard-wired media access control (MAC) address. Other radio modules could be used to achieve the same functionality.

The MAC address may provide the wireless radio 14 with a unique identifier so that wireless radio 14 may be found on a network, such as a mesh network. The wireless radio 14 may, for example, provide multiple general-purpose input and output (VO) connections used to implement the functionality of the relay 16, first interface 18, second interface 20, tunable white temperature control interface 22, and digital address lighting interface 24 and a universal asynchronous receiver-transmitter (UART) connection for serial communications.

The relay 16 may be any device that is capable of switching electrical power to a lighting fixture, such as an LED driver 202. The relay 16 may include an electrical contact rated to switch line voltage alternating current power. The relay 16 may energize the lighting fixture 212 through the LED Driver 202, thereby allowing power to flow to the lighting fixture 212, when in an on or closed position and de-energize, thereby preventing power from flowing to the lighting fixture 212, when in an off or open position. The relay 16 may furthermore receive a signal from the wireless radio 14 that switches the relay 16 between its on and off states. Thus, the relay 16 may actuate the lighting fixture 212 to be energized and illuminated when the relay 16 is in its on or closed position and actuate the lighting fixture to be de-energized and not illuminated when the relay 16 is in its off or open position.

Figure 2:
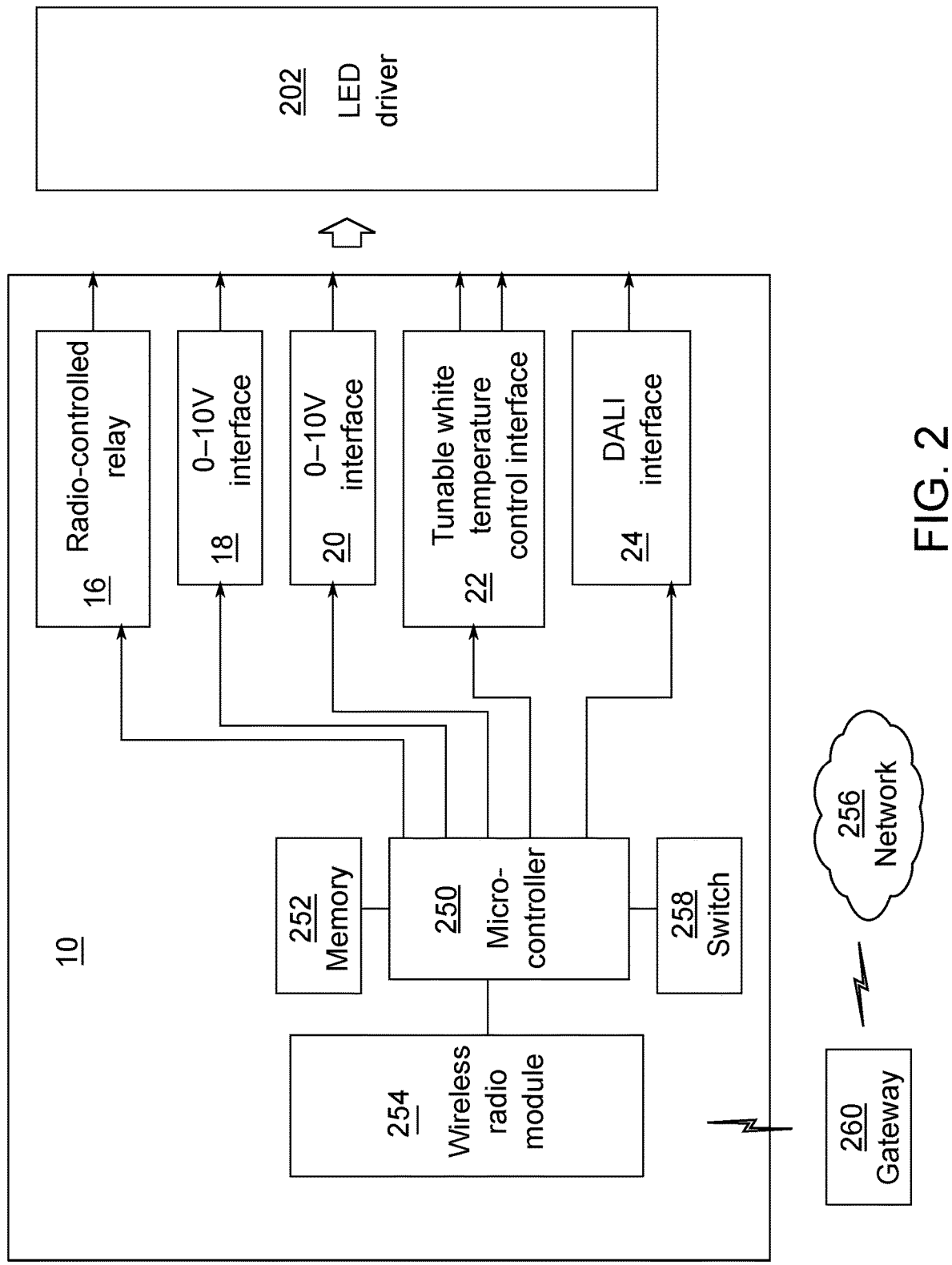
FIG. 2 illustrates a block diagram of another embodiment of a wireless luminaire controller.

The first and second interfaces 18 and 20 may each provide a 0-10V control signal and may each include circuitry for converting a digital pulse-width modulated (PWM) signal to an analog 0-10 VDC signal. The 0-10V interfaces may, thus, receive a PWM signal from the wireless radio 14, convert that PWM signal to a 0-10 VDC control signal, and output the 0-10 VDC control signal to an LED driver 202, which in turn controls the luminaire 212 in accordance with the 0-10 VDC control signal. Conversion of the PWM signal may be performed by coupling the PWM signal to a low-pass filter in series with a transistor. The output of that combination of the transistor and low-pass filter may convert the PWM signal to a 0-10V signal for control of the lighting fixture 212 through the driver 202, as illustrated in FIG. 2. The 0-10V DC signal may furthermore be provided to the lighting fixture controller to control the brightness, color temperature, or another aspect of the light output by the lighting fixture coupled to and controlled by the lighting fixture controller.

In another embodiment, the wireless luminaire controller 10 may detect the presence of dimming control at the LED driver 202. In that embodiment, the first channel interface 18 may be coupled to an analog to digital converter input (ADC) 220 on the wireless luminaire controller 10. In such an embodiment, if the LED driver 202 that the 0-10V first channel interface 18 is connected to has a dimming feature or is otherwise adapted to be coupled to a 0-10V signal, the LED driver 202 will be a 10V source, providing 10 volts unless the driver 0-10V output 18 or 20 modifies that voltage. If the 10V source is detected at the ADC input 220, it can be determined that the driver 202 is generating the 10V and is configured to receive a dimming control signal. A general purpose input output (GPIO) can be used as an indicator of the presence of the 10V source in one embodiment. In that embodiment, the GPIO will be high if the 10V signal is detected and the GPIO will be low if the 10V source is not detected.

A second dimming signal detection can also be provided on the wireless luminaire controller 10 second channel interface 20 by coupling the output of the second channel interface 20 to a second input 222 on the wireless luminaire controller 10.

The digital lighting control protocol interface 24 may, for example, be a digital addressable lighting interface (DALI), a DMX512 interface or another desired type of digital lighting control protocol. Where, for example, the digital lighting control protocol interface 24 is a DALI interface, the digital lighting control protocol interface 24 may receive instructions in a DALI protocol from the wireless radio 14 and translate those instructions to the DALI protocol. The translated instructions may then be output to a DALI driver by, for example, shifting a voltage level of the signal to a 0V/16V signal that is required by the DALI standard. The signal to be sent to the DALI interface may be transmitted from the microcontroller in a universal asynchronous receiver-transmitter (UART) protocol and may be transmitted through a UART interface.

FIG. 2 illustrates an embodiment of the wireless luminaire controller 10 that includes a single microcontroller 250 that provides computational functionality for all components of the wireless luminaire controller 10. The wireless luminaire controller 10 also contains a memory device 252 separate from and coupled to the single microcontroller 250. The separate memory device 252 contains instructions for operation of the single microcontroller 250. In certain embodiments, when the wireless luminaire controller 10 is de-energized and then re-energized, the microcontroller 250 downloads software from a central device and loads that software, which includes instructions for operation of the microcontroller 250 onto the separate memory device 252.

The wireless luminaire controller 10 illustrated in FIG. 2 also includes a radio 254. That radio 254 may communicate wirelessly with other devices in a wireless network 256. The wireless network may be a mesh network and may, for example, operate using a Zigbee protocol. For example, the wireless luminaire controller 10 may communicate with a wireless luminaire control device, which may be mounted on a wall for operation by a user or carried by a luminaire user and may permit the user to control energization, intensity, or color of the luminaire.

The wireless luminaire controller 10 of FIG. 2 may also include a relay for switching power to the luminaire, one or more zero to ten volt drivers to each provide a control signal to the luminaire, a digital addressable lighting interface (DALI) to provide a control signal to the luminaire, and a driver for a constant current output to provide power to an LED fixture 212.

The relay 16 may be driven by a digital output provided by the single microcontroller 250.

In the embodiment illustrated in FIG. 2, the relay 16 switches the line voltage alternating current to energize and de-energize one or more LED lighting fixtures. In such an embodiment, each of the 0-10V outputs may serve as a control signal to control the lighting intensity or color of the LED lighting fixture or lighting string. Furthermore, in certain embodiments, the radio 14 may provide pulse-width-modulated (PWM) signals to one or more 0-10V interfaces 18 or 20 and the 0-10V interface 18, 20 may convert that PWM signal to a corresponding 0-10V modulated signal used to control an aspect of an LED string or fixture 212 by interfacing to a driver 202 with the appropriate inputs.

In an embodiment, an LED fixture 212 is coupled to a driver 202 that receives line voltage power that is switched by the relay 16 of the wireless luminaire control 10 and a 0-10V intensity dimming signal from one of the 0-10V interfaces 18 or 20 that provides a light intensity signal to control the light intensity of the LED light fixture 212. The LED light fixture 212 may also receive another signal from the wireless luminaire control 10 that indicates to the LED light fixture 212 what color or temperature the light emanating from the LED fixture 212 should be. For example, an LED light fixture 212 can provide what appears to be and is commonly referred to as a warm color of light, a cool color of light, or a color that is between warm and cool. That color may furthermore be controlled by a control signal emanating from the wireless luminaire control 10, such as the tunable white temperature control interface 22 of the wireless luminaire control 10.

One or more of the 0-10V drivers 18 and 20, the DALI interface 24, the tunable white temperature control interface 22, and a constant current output 30 may be driven by pulse-width-modulated or UART signals provided from the microcontroller 250. The 0-10V driver may furthermore convert the PWM signal received from the microcontroller 250 to a 0-10V signal that is standard in the lighting control industry and transmit that 0-10V signal to the lighting fixture 212. That 0-10V signal transmitted to the lighting fixture 212 may correspond to a brightness level that the luminaire LED fixture 212 should be providing or a color or other aspect of light provided by the luminaire fixture 212.

The wireless luminaire controller 10 illustrated in FIG. 2 may also include a hardware switch 258 that causes the single microcontroller 250 to execute instructions to join the wireless network 256 when the hardware switch 258 is actuated. The wireless luminaire controller 10 may, furthermore, download instructions for its performance to be stored in the separate memory 252 and executed by the microcontroller 250 when the wireless luminaire controller 10 joins the network 256.

FIG. 3 illustrates an embodiment of an LED light fixture installation 200. The LED light fixture installation 200 of FIG. 2 includes an LED driver 202 with at least one signal input 204, a power input 206, and an LED power output 208. An embodiment of a wireless luminaire controller 10 and an LED fixture 212 are also included in the LED light fixture installation 200.

The LED driver 202 may be connected to the LED light fixture 212 input 218 at its LED power output 208 with a return 219 by wire. The LED driver 202 may be coupled to a user control 210 at its input by either wire or wirelessly.

In the embodiment illustrated in FIG. 3, the wireless luminaire controller 10 provides one or more signals or power to the LED driver 202 and the LED driver 202 provides appropriate power to the LED fixture 212 commensurate with the power and signals received at the LED driver 202 from the wireless luminaire controller 10.

In an embodiment, the LED driver 202 may be connected by wire directly to line alternating current at the power input 206 and may provide a constant current power output to the LED fixture 212 in accordance with one or more signals received at the LED driver 202 input 204 from the wireless luminaire controller 10.

The LED power output 208 may be a constant current output that is created from the line alternating current received at the LED power input 206 and that power may be provided to one or more LED fixtures 212, wherein each fixture 212 may contain more than one string of different color LEDs.

The LED driver 202 first input 204 may be configured to receive a 0-10V dimming signal from the wireless luminaire controller 10, as is illustrated in FIG. 3 or another type of signal output by the wireless luminaire controller 10. The LED driver 202 may include one or more additional inputs 205 to receive one or more additional control signals, which may, for example, be 0-10V signals or another desired signal and may, for example, control what is commonly referred to as the warmth of the light that is to be output by the lighting fixture 212.

The user control 210 may have one or multiple functions. One of those functions may be an on/off control that may be actuated by a user to energize and de-energize the LED fixture 212. Another function of the user control 210 may be dimming. Yet another function of the user control 210 may be a lighting color temperature control that varies the color of the light emitted by the LED fixture 212 between what are generally referred to as a warm light and a cool light. Other user control functions desired may also or alternately be performed through the user control 210.

User control functionality may be performed in various ways desired, including through a manually actuated dimmer switch or a user actuated computer control.

In one embodiment, the user control 210 includes a manually actuated slide type of dimming control 214 that may be positioned over a linear range and is often moved manually in a vertical orientation. That manually actuated slide control 214 may be moved throughout its linear range from top to bottom. In such a configuration, the LED fixture 212 may be de-energized when the control switch is in the lowest position of its slide, the LED fixture 212 may be energized at a low lighting level when the manually actuated slide control 214 is moved upward a small amount from the lowest position of its slide, the lighting level of the LED fixture 212 may increase gradually as the manually actuated slide control 214 is slid upward more, and the LED fixture 212 may be energized at its brightest level when the manually actuated slide control 214 is slid to the top of its vertical range. Such a manually actuated control may include more than one switch or slide and may include a radio for communication with the wireless luminaire controller 10. Communication between the user control 210 and wireless luminaire controller 10 may furthermore by performed through the gateway 260.

In an embodiment, the user control 210 performs an additional second function to modulate light from the LED fixture 212 from what is commonly referred to as a cool light to a warm light. In an embodiment, the control may be or include a second manually actuated control 216 that may be manipulated, for example by sliding, to control the temperature of the light emitted from the LED fixture 212. In such an embodiment, the second manually actuated control 216 may cause the LED fixture 212 to emit its warmest light at a first end of the second manually actuated control 216 range, its coolest light at a second end of the second manually actuated control 216 range, and may modulate between cool and warm light when moved between the first and second ends of the second manually actuated control 216.

In certain embodiments, the user control 210 may include an occupancy sensor 217.

In an embodiment in which the user control 210 is coupled wirelessly to the wireless control device 400, a radio board 300 may be incorporated into the user control 210 to communicate with other radio boards such as radio board 14 in the wireless control device 400 such that the user control 210 may transmit information to the wireless control device 400 by way of those radios 300 and 14. In certain embodiments, the wireless control device 400 may also communicate a control signal to the user control 210. Communication between radios 300 and 14 may be performed via gateway 260. Because of its capability to be coupled to sensors and fixtures, fixture drivers, or other loads 402, the wireless control device 400 is well adapted for conversion installations where at least one sensor is directly wired to at least one fixture 402 prior to the conversion. In such a situation, control of that fixture 402 can quickly and inexpensively be made more capable by converting the installation from a wired fixture control to a wireless fixture control using the wireless control device 400. In such a conversion, the existing wires can be used to connect the sensors 404 and fixtures or drivers 402 to the wireless control device 400, which can communicate with one or more central control devices, such as the gateway 260 to receive remote control signals and operational rules.

In one embodiment, the wireless luminaire controller 10 provides color control of a constant current driver 202 output 208 using a single output 32 that controls driver constant current 30 to two separate LED strings 213 and 215. Those two LED strings 213 and 215 may be different colors and, therefore, the control may vary the color temperature output of a fixture 212 containing those two separate LED strings.

In an embodiment of color control of a constant current driver 202 output 208, an LED DC input 32 of the wireless luminaire controller 10 takes the constant current output 208 from the driver 202 and directs it to the LED strings 213 and 215 from output 32. Each of the LED strings 213 and 215 is associated with an LED DC return 34 and 36. Those returns 34 and 36 include circuitry that permit a wireless luminaire controller 10 output 224 to control which LED string 213 and 215 the constant current driver 202 output 208 flows through, thereby controlling the color of the light provided by the fixture 212. In such an embodiment, the wireless luminaire controller 10 may provide direct current received from an LED driver 202 to illuminate the LED fixture 212 on the LED DC output 32 to one or more LED fixtures 212. The connection between the LED DC output 32 and the LED fixture 212 may be made with wire. The LED returns 34 and 36 can complete the LED DC power circuit by receiving a return wire from each string 213 and 215 in the LED fixture 212.

In the embodiment illustrated in FIG. 3, a light intensity signal may be transmitted from the wireless luminaire controller 10 at, for example, the first channel interface 18, and that light intensity signal may be transmitted by wire to an LED driver 202. The LED driver may output a direct current from the LED power output 208 appropriate to power the LED fixture 212 to the desired intensity. In an embodiment that does not include color temperature control, that output 208 may be coupled directly to the LED fixture 212 at 218, as is illustrated in FIG. 3. In an embodiment where the wireless luminaire controller 10 is to control color temperature, however, the driver 202 output 208 may be coupled to the wireless luminaire controller 10 driver constant-current output at 30. The wireless luminaire controller 10 may vary the current flowing through each LED string 213 and 214, for example using a PWM signal from the wireless radio 14, to alternate a constant current and voltage between one color LED string and another color LED string to create a desired color temperature emanating from the LED fixture 212.

In an embodiment, the tunable white temperature control interface 22 may include circuitry that converts the PWM signal to two complementary signals to control the color of two different color LED strings in a lighting fixture 212. In such an embodiment, direct current received at the driver constant current output 30 from the driver 202 is output to an LED fixture 212 having a warm color temperature string 213 and a cool color temperature string 215. The LED DC return 34 for the warm string 213 may include a MOSFET 226 and the LED DC return 36 for the cool string 215 may include a logic inverter gate 230 and a MOSFET 228. In such an embodiment, a PWM control signal drives the gate terminal of the first MOSFET switch 226 and indirectly drives the gate terminal of the second MOSFET switch 228 through the inverter 230. The inverter 230 assures that the first and second MOSFETs 226 and 228 are always in opposite conductive states, with the result that the driver constant current 208 from driver 202 is alternated between the warm and cool LED strings 213 and 215 of the LED fixture 212. The ratio of on time to off time in each LED string blends the two colors to allow a continuous change in color temperature based on the duty cycle of the PWM signal.

In an embodiment, the tunable white temperature control interface 22 may include circuitry that converts a PWM signal to two complementary signals to control the color of two different color LED strings in a lighting fixture 212. In one such embodiment, the color of a string of LED lights may be said to range from "cool" to "warm." The first of the PWM signals transmitted from the tunable white temperature control interface 22 may be transmitted to an LED driver 202 or, alternatively, to a "cool" LED string. The second color control signal may also be transmitted from the tunable white temperature control interface 22 to the LED driver 202 or to a "warm" LED string. The tunable white temperature control interface may contain an inverter to generate an inverted PWM signal, so that both PWM and inverted PWM signals may be used to separately control the warm and cool LED strings. The two LED strings of different temperatures are thus driven in a complementary manner, resulting in varying color temperatures of light emitted from the fixture 212 as the duty cycle of the PWM signal varies.

Figure 4:
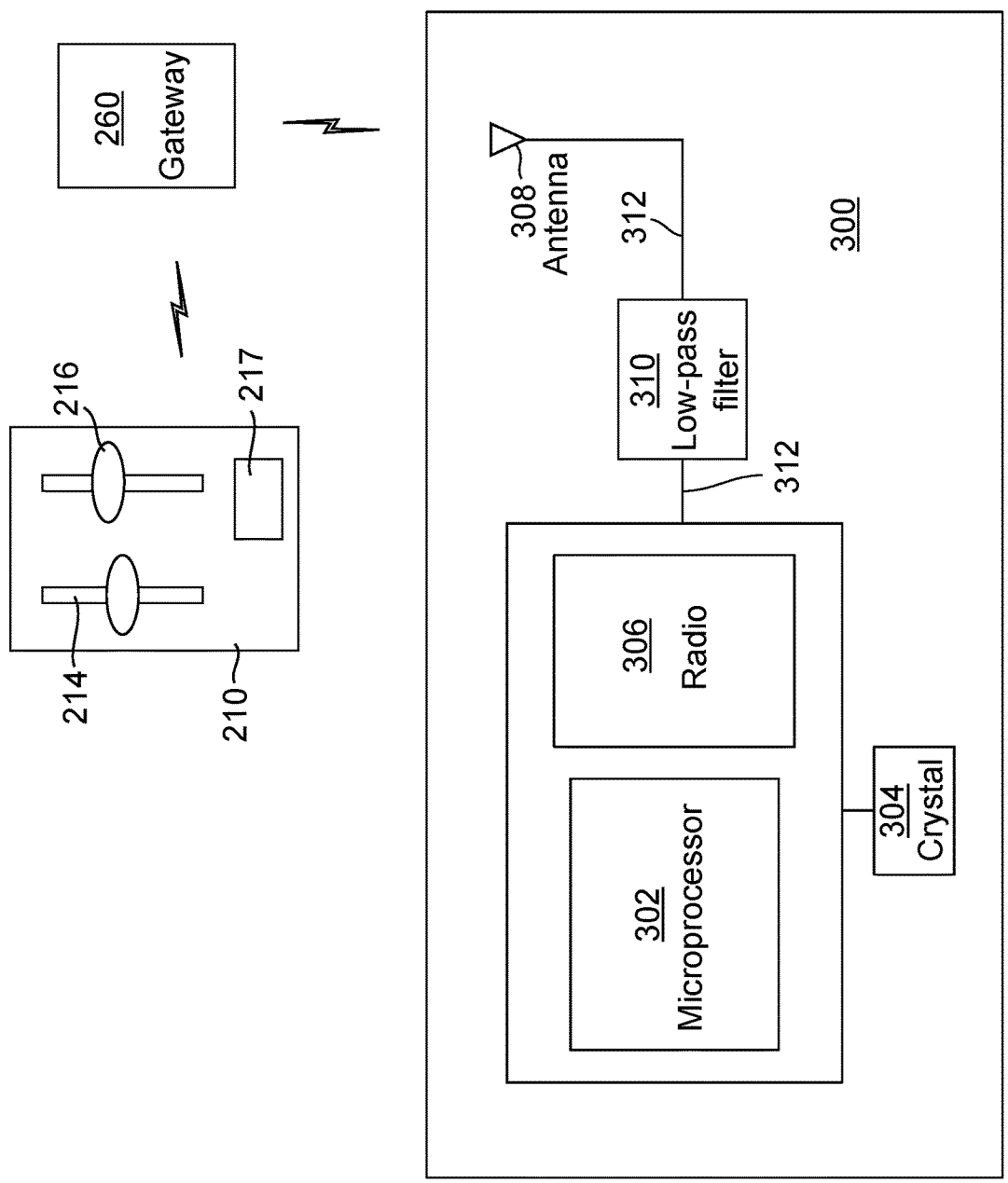
FIG. 4 illustrates an embodiment of a radio board.

FIG. 4 illustrates an embodiment of a radio board or module 300. The radio board 300 includes a microprocessor 302, a timer crystal 304, a radio transceiver 306, and an antenna 308. The radio board or module 300 may also include a low-pass filter 310 and one or more transmission/reception lines 312.

The radio board 300 may communicate with other devices by way of a Zigbee protocol or other wireless protocol. Those other devices may include other control devices such as other wireless luminaire controllers 10, manual controls such as the dimming switch 214, gateways 260, and computing devices (not shown).

The radio board 300 may also include circuitry to couple the various components 302, 304, 306, 308, and 310 of the radio board 300. The radio board 300 circuitry may furthermore include transmit (TX) and receive (RX) paths and an integrated and hard-wired media access control (MAC) permanent unique identifier.

The microprocessor 302 may be any of a variety of microprocessors, including an ARM Cortex-M3 or M4 and may be embedded on a transceiver integrated circuit. A microcontroller may be used and operate as the microprocessor 302.

The crystal timer 304 is a device that creates an electrical signal with a precise frequency. The crystal timer 304 provides a stable clock signal to the radio transceiver 306 and ensures frequency accuracy of the transmit signal.

The radio transceiver 306 may be any of a variety of radio transceivers including a Silicon Labs EM35x, EFR32 or CSR CSR1010 model radio transceiver. The radio transceiver 306 may incorporate a radio frequency (RF) transceiver 306 with baseband modem, a hardwired MAC and the microprocessor 302 or a microcontroller. The radio transceiver 306 may have a single RF transmit (TX) and reception (RX) port, or may have a separate transmit output and a separate reception input operated by an external TX/RX switch. The radio transceiver 306 also has a clock input to receive a signal from the crystal timer 304.

The antenna 308 may be of various constructions and may, for example, take the form of an integrated Printed Circuit Board (PCB) trace antenna or an external antenna connected through pin(s) on a radio module. There may furthermore be a common antenna 308 for both the transmit and receive functions or separate antennas for each of the transmit and receive functions.

The low-pass filter (LPF) 310 stops high frequency radio signals from being transmitted from the radio transceiver 306 and permits the desired frequencies to pass through the LPF 310 and be transmitted. The low-pass filter 310 may be included on the radio module between the radio transceiver 306 and the antenna 308.

Transmission lines are wires that connect the transceiver 306 to the antenna 308. Transmission lines may be arranged in various ways including a single transmission line connecting the transceiver 306 to the antenna 308, possible through the low-pass filter 310, or two transmission lines extending from the transceiver 306 connecting at a duplex junction (such as a TX/RX switch) and a third transmission line connecting that junction to the antenna 308.

The transmit/receive (TX/RX) switch switches between transmit and receive functions if the transceiver 306 is using separate transmit (TX) and receive (RX) circuits. The transmit/receive (TX/RX) switch may be included on the radio transceiver 306 in an integrated circuit type system, connected to the TX output and RX input of the radio transceiver 306.

A low noise amplifier (LNA) may be employed to amplify a received radio frequency (RF) signal. That low noise amplifier may be internal or external to an integrated circuit that includes the transceiver 306.

A power amplifier (PA) may also be incorporated in the radio board 300 to amplify a signal to be transmitted from the radio board 300. The power amplifier generally delivers high efficiency, high gain and high output power (for example the power output of the power amplifier may be equal to the signal received plus 20.0 dB) to provide an extended range and reliable transmission for fewer nodes in a network. The power amplifier may be internal or external to an integrated circuit that includes the transceiver 306.

In one embodiment, the wireless luminaire controller 10 can be used for wireless control of an LED fixture 212 with dimming. In such an embodiment, the wireless luminaire controller 10 may be configured with the components described hereinbefore and with the relay 16 coupled to the power input 206 of the LED driver 202. The LED driver 202 would have its LED power output 208 wired to the power input of one or more LED fixtures 212 in such an embodiment. When placed in its energized state, the relay 16 energizes the driver 202 the LED fixture 212, in many embodiments through the driver 202, and when placed in its de-energized state, the relay 16 de-energizes the LED fixture 212, possibly through the driver 202.

The first channel interface 18 of the wireless luminaire controller 10 in that embodiment may be coupled to the LED driver 202 input 204. The output signal of the wireless luminaire controller 10 first channel interface 18 may vary from 0-10V to dim or brighten one or more LED fixtures 212.

In that embodiment, the wireless luminaire controller 10 may be coupled to the manually actuated dimming control 214 wirelessly through the wireless radio 14 such that a signal from a controller such as the manually actuated dimming control 214 may be received at the wireless luminaire controller 10 and a 0-10V signal that is commensurate with the signal received from the manually actuated dimming control 214 may be output from the first channel interface 18 of the wireless luminaire controller 10 to the LED driver 202 for control of the brightness of the LED fixture 212.

In another embodiment, the wireless luminaire controller 10 may have its second channel interface 20 coupled to the LED driver 202 such that a second light color signal may be received from the manually actuated dimming control 214 at the wireless luminaire controller 10. A 0-10V signal that is commensurate with the light color signal received from the manually actuated dimming control 214 may be output from the second channel interface 20 of the wireless luminaire controller 10 to the LED driver 202 for control of the color or warmth of light emanating from the LED fixture 212. In that embodiment, the manually actuated dimming control 214 may have a second control switch or lever, such as a manual slide control, that can be manually actuated to create the second light color signal and thereby vary the color of the light emanating from the LED fixture 212 from what is commonly referred to as a cool light to what is commonly referred to as a warm light.

The wireless luminaire controller 10 may control more than one LED fixture 212. For example, the controller may provide control signals for one or both of light intensity and light color to the LED driver 202 and the LED driver 202 may provide the appropriate power to an LED warm temperature fixture 212 and an LED cool temperature fixture 212 in parallel. Alternately, the wireless luminaire controller 10 may directly transmit a current commensurate with a desired intensity level and color to one or more LED fixtures 212.

In another embodiment, the wireless luminaire controller 10 provides a DALI signal to the LED driver 202 with instructions for one or both of lighting intensity and lighting color and the LED driver 202 provides a commensurate DC voltage to one or more LED fixtures 212.

Figure 5:
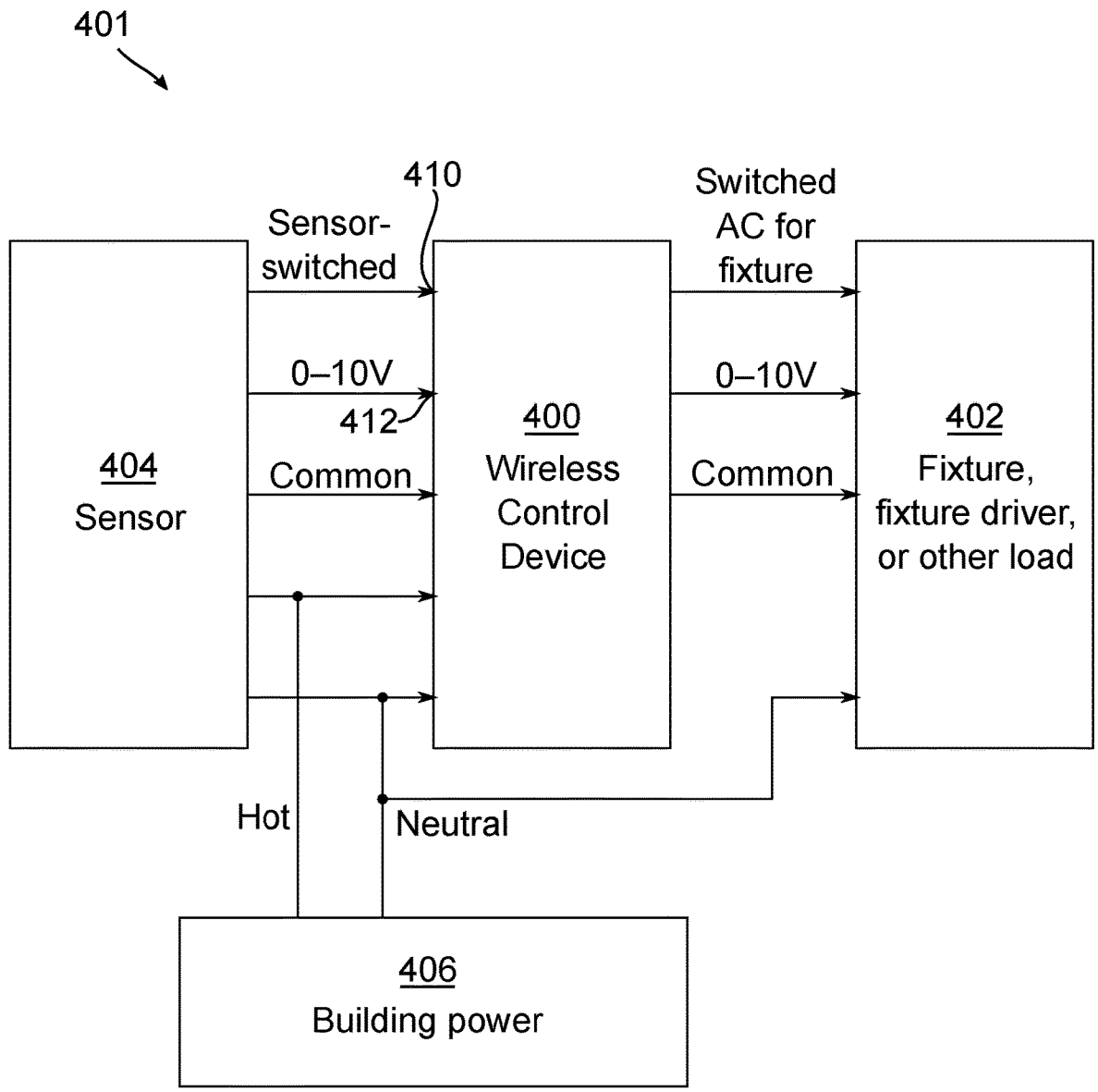
FIG. 5 illustrates an embodiment of a wireless control device coupled to a sensor and to a load.

FIG. 5 illustrates an embodiment of a wireless control device 400. The wireless control device 400 couples to a luminaire, luminaire controller, or other load 402 and one or more sensors 404. The wireless control device 400 may also couple to building power 406 or may be powered from a local power source. In the embodiment illustrated in FIG. 5, the load 402 and sensor 404 are hardwired to the wireless control device 400 and the wireless control device 400 communicates wirelessly with other nodes such as the gateway 260 illustrated in FIG. 4. As discussed below, that configuration is particularly useful in retrofit installations.

The luminaire 402 may be one or more of any of a variety of types of lighting fixtures, including a LED luminaires, fluorescent luminaires, incandescent luminaires, and halogen luminaires, for example. Moreover, the luminaire 402 may be a controller for a luminaire, such as an LED luminaire that requires such a controller. Building power 406 may, furthermore, be available near the luminaire 402 and may be provided to the wireless control device 400 for luminaire 402 switching and, where required, to the sensor 404.

The sensor 404 may be a variety of sensors and may include, for example, an occupancy sensor, an ambient light sensor, or switch. Thus, the sensor 404 may include a binary occupancy sensor that, for example, transmits an on signal to the wireless luminaire control device 400 when it senses motion and transmits an off signal to the wireless luminaire control device 400 when it has not sensed motion for a predetermined period of time.

The sensor 404 may alternatively or in addition sense ambient light level to which it is exposed. The sensor 404 may transmit ambient light level to the wireless control device 400 by way of a two-position signal providing, for example, a simple day/night signal, or may transmit an analog ambient light level to the wireless control device 400.

Because of its capability to be coupled to sensors 404 and fixtures or fixture drivers 402, the wireless control device 400 is well adapted for conversion installations where an existing building is being retrofit from a traditional lighting system to an automated lighting system, such as the wireless fixture control system 401 illustrated in FIG. 5. In such a situation, at least one lighting control, such as a traditional light switch, may have been directly wired to at least one fixture 402. Control of that fixture 402 may be quickly and inexpensively automated and made more capable by converting the installation from a wired fixture control to a wireless fixture control system 401 using the wireless control device 400. In such a conversion, the existing wires can be used to connect the sensor 404 and electrical load 402 to the wireless control device 400, which can communicate with a central control device such as the gateway 260 illustrated in FIG. 4 to receive remote control signals and operational rules. The wireless control device 400, thus, has a benefit of being able to communicate wirelessly with a central control device, such as the gateway 260, and that central control device may provide control rules or functions to the wireless control device 400 wirelessly for operation of the lighting fixture or other load 402.

The wireless control device 400 may also have a persistence feature such that if there is a failure of communication with the central control device, the wireless control device 400 can continue to control the fixture(s) 402 based on sensed data received from the sensor 404 or another device connected to the wireless control device 400 and control rules contained within the wireless control device 400. Those control rules may, furthermore, have been downloaded from the gateway 260 or another wireless device that was previously communicating with the wireless control device 400.

In an embodiment, the wireless control device 400 includes a single microcontroller and a separate memory device coupled to the single microcontroller, the separate memory device containing instructions for operation of the single microcontroller. The wireless control device 400 also includes a radio coupled to the single microcontroller for communication with a node on a wireless network. That wireless control device 400 has outputs including a relay coupled to the single microcontroller for switching power for a luminaire or other electrical load and a first microcontroller pulse width modulated output coupled to a first zero to ten-volt driver interface to provide a first control signal for the electrical load. The wireless control device 400 also has inputs including a first input to receive an occupancy signal from a sensor and a second input to receive an ambient light signal from that or another sensor. The wireless control device 400 of that embodiment also includes a hardware switch that causes the single microcontroller to execute instructions to join a wireless network when the hardware switch is actuated. In that embodiment, the single microcontroller has a processor that includes instructions which, when executed by the processor, cause the processor to control the relay and the first control signal based on the first input, the second input, and control rules stored in the processor.

In certain embodiments, the wireless control device 400 enables wireless connection to otherwise non-wireless lighting devices. Such devices include but are not limited to 0-10V controllable loads (e.g. LED drivers & luminaires), occupancy sensors (e.g. high-bay, low-bay, passive infrared, ultrasonic, microwave, dual-tech), ambient light sensors, combined occupancy and ambient light sensors, in-wall wired light switches, and in-wall wired 0-10V light dimmers.

The wireless control device 400 may provide one or more functions, including sense or interface with a sensor 404, such as a switch or occupancy sensor; actuate a fixture, a receptacle, or another load 402; and meter power used by the load 402. The wireless control device 400 may perform its control function based on sensed information, internal processing (which may include operational rules), and information received from one or more remote wireless control devices, such as gateway 260.

Where information is not received from a remote wireless control device, such as gateway 260, the wireless control device 400 may persist in controlling the lighting fixture based on its own local sensed and programmed rules without communicating with the remote wireless control device 400.

The wireless control device 400 may be coupled to a combined light switch and dimming switch 404. The lighting switch portion of the sensor 404 may provide a manual energize/de-energize signal and the dimming switch portion of the sensor 404 may provide a lighting level signal.

The wireless control device 400 illustrated in FIG. 5 may also wirelessly communicate with one or more other devices, such as the gateway 260 illustrated in FIG. 4 or another central control device. The wireless control device 400 may receive lighting on/off and level commands from such a wirelessly coupled device in addition to the sensor 404. The wireless control device 400 may, therefore, receive commands from both the sensor 404 connected directly to the wireless control device 400 and remotely from a wirelessly communicating device and may prioritize any conflicting commands based on rules that may be maintained at the wireless control device 400 or may be received at the wireless control device 400 from a remote device.

The wireless control device 400 may have control persistence if it loses communication with a central control device, such as the gateway 260. The control persistence may act such that if communication with the remote device, such as the gateway 260, which is providing control information, such as operational rules, to the wireless control device 400 fails, the wireless control device 400 will continue to control the lighting fixture or other load 402 based on the sensor 404 signals it receives and possibly on rules retained by the wireless control device 400 and executed by the wireless control device 400 processor. Thus, if wireless communication at the wireless control device 400 fails, the fixture driver or other load 402 may continue to be controlled in accordance with manual or sensed information received from the sensor 404 in accordance with rules being executed by a processor in the wireless control device 400.

The wireless control device 400 also may perform metering and analysis of that metering for the fixture or fixtures or other load 402 controlled by the wireless control device 400. Such metering may assist in the determination of system efficiency and may aid in diagnosing system degradation or failure.

Metering may include a direct or calculated energy consumption determination and record keeping of energy consumed by one or more fixtures or other loads 402. Such metering may also or alternatively be used to track energy consumption of various building units or in determining extra charges to be applied to tenants, for example.

Metering may also or alternately determine fixture, fixture driver, or other load 402 well-being based on energy consumption readings. For example, a failing fixture driver may consume more power than a fixture driver that is working properly. Therefore, in an embodiment, the wireless control device 400 may track energy consumption by fixtures and drivers and provide a message, possibly through a control device gateway, to a user terminal that informs the user when a fixture or fixture driver power consumption has increased more than a predetermined amount, such as 10%. That information may then be used to schedule maintenance or replacement of the fixture or fixture driver because the fixture or fixture driver is likely failing.

Figure 6:
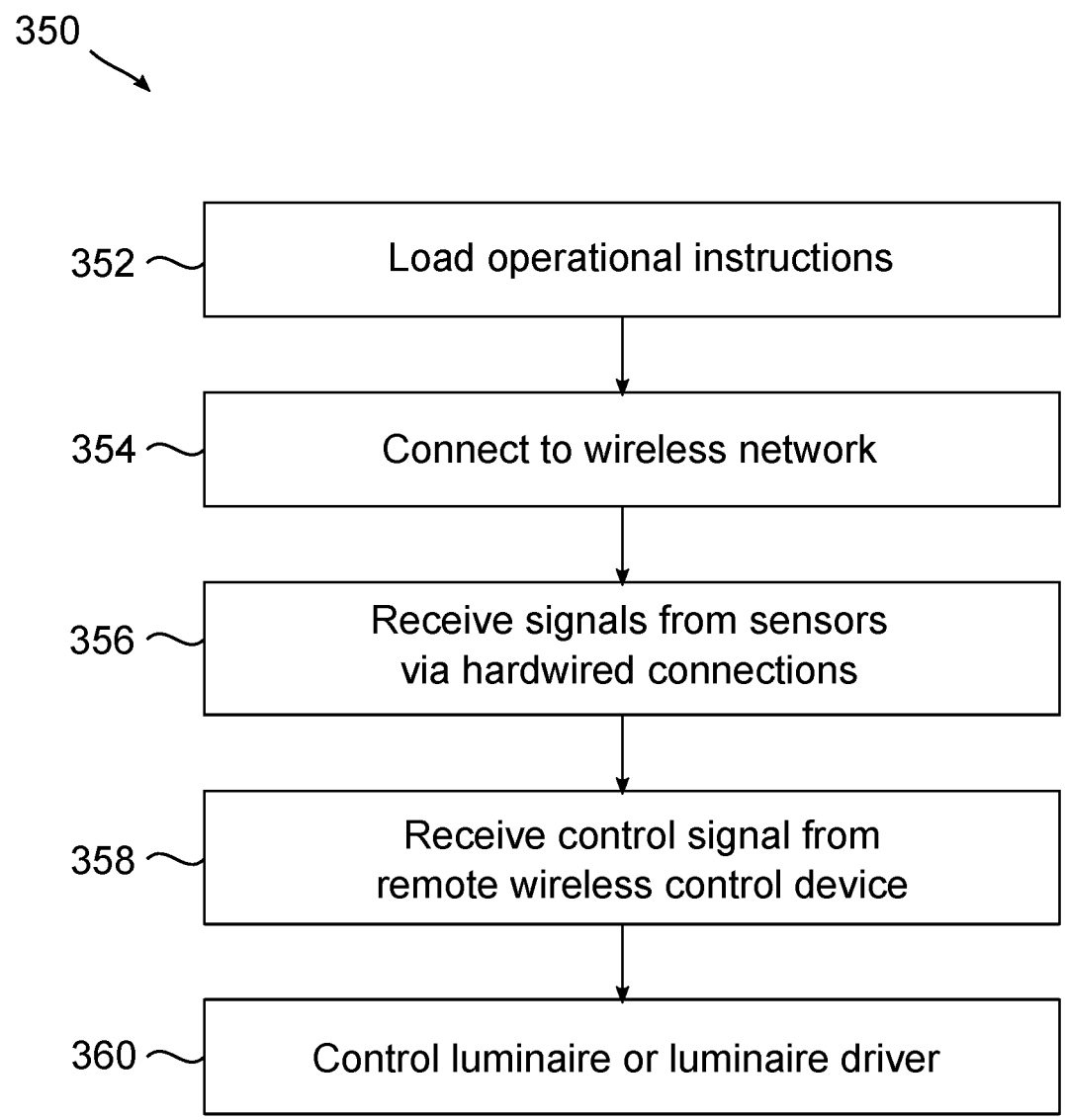
FIG. 6 illustrates an embodiment of a method of operating a wireless luminaire to control an LED luminaire fixture.

FIG. 6 illustrates a method 350 of operating a wireless control device 400 to control a load, such as a luminaire fixture 402. In that method 350, the wireless control device 400 is hard wired to at least one load 402 and at least one sensor 404 at 352. In an embodiment, the wireless control device 400 has a relay output to energize and de-energize the load 402 over wire and a control output to provide a control signal to the load 402 over wire. That embodiment also has a first input to receive an occupancy signal from a sensor 404 over wire and a second input to receive an ambient light signal from the same or another sensor 404 over wire.

The wireless control device 400 in this method uses a single microcontroller 250 to control a separate memory device 252, a radio 254 for wireless communication, a relay 16 for switching power to a load, a zero to ten-volt control output 18, a hardware switch 258, an occupancy input 410, and an ambient light input 412. The separate memory device 252 stores operational rules and instructions and downloads those operational instructions to the single microcontroller 250 when the single microcontroller 250 and separate memory 252 are energized at 352. The hardware switch 258 causes the single microcontroller to execute instructions to join a wireless network when the hardware switch is actuated at 354. The occupancy input 410 and ambient light input 412 are hardwired to receive appropriate signals at 356. The radio 254 receives a control signal from a remote wireless luminaire control device at 358. Where that control signal received by the radio 254 includes operational instructions, those instructions are stored in the separate memory 252. The relay 16 switches power to the luminaire 212 or the luminaire driver 202 to provide hardwired power to the luminaire 212 and the zero to ten-volt control output 18 provides a first control signal to be hardwired to the luminaire 402 at 360. In that method, the wireless control 400 controls at least one of the relay 16 and the zero to ten-volt control output 18 based on at least one of the occupancy input 410 and the ambient light input 412. That control is also based on control rules stored in the separate memory device 252 and executed by the single microcontroller 250.

The wireless control device 400 may include multiple signal generators such as, for example, the first channel interface that may provide a 0-10V control signal to control dimming or another function of the luminaire 212 or the luminaire driver 202, the second channel interface that may provide a 0-10V control signal to control temperature or another function of the luminaire 212 or the luminaire driver 202, the tunable white temperature control interface 22 that may provide a temperature control signal that is other than a 0-10V signal to the luminaire 212 or luminaire driver 202, the digital lighting control protocol interface 24 that may provide communication of a signal to the luminaire 212 or the luminaire driver 202 through a digital lighting control protocol such as digital address lighting interface (DALI) protocol, the driver constant current output 30, and an LED DC output 32. It should also be noted that few luminaires 212 or luminaire drivers 202 will be coupled to all those signal generators. Rather, some or all of that variety of signal generators may be included in the wireless luminaire controller 10 so that the wireless luminaire controller 10 can operate with a wide variety of luminaires 212 and luminaire drivers 202.

The separate memory device 252 may operate to download instructions for the wireless control device 400 from the network 256 when it is energized and may, in turn, download operational instructions to the microcontroller 250 when the separate memory is energized. In that way if, for example, new software is to be loaded on the microcontroller 250, the loading process can be as simple as de-energizing and re-energizing the wireless luminaire controller 10.

The radio 300 may be configured to communicate with, receive messages from, and transmit messages to other devices on the network 256. For example, the radio 300 may receive operating instructions for its microprocessor 302 from a gateway (i.e., 260) on the network (i.e., 256), may receive a control signal from a remote wireless luminaire control device, such as a dimmer switch (i.e., 210), and may transmit information, such as control commands and sensed status of its connected luminaire 212 through a mesh network (i.e., 256).

The relay 16 switches power to the luminaire 212 while the control outputs at 352-360 may be providing signals regarding qualities of the light emanating from the luminaire 212.

The hardware switch 258 may be used to energize and de-energize the wireless luminaire when the hardware switch 258 is actuated.

The first channel interface 18 and the second channel interface 20 may receive pulse width modulated signals from the single microcontroller 250 and convert those signals to 0-10V signals or another type of signal that is employed in the lighting control industry.

While specific embodiments of the invention have been described in detail, it should be appreciated by those skilled in the art that various modifications and alternations and applications could be developed in light of the overall teachings of the disclosure. Accordingly, the particular arrangements, apparatuses, and methods disclosed are meant to be illustrative only and not limiting as to the scope of the invention.

What is claimed is:

1. A wireless luminaire control device, comprising:
a single microcontroller;
a separate memory device coupled to the single microcontroller, the separate memory device containing instructions for operation of the single microcontroller;
a radio coupled to the single microcontroller for communication with a node on a wireless network;
a relay coupled to the single microcontroller for hardwired luminaire power switching;
a first microcontroller pulse width modulated output coupled to a first zero to ten-volt driver interface to provide a first control signal to be hardwired to control the luminaire;
a second microcontroller pulse width modulated output coupled to a second zero to ten-volt driver interface to provide a second control signal to be hardwired to control the luminaire;
a first microcontroller input to receive a hardwired occupancy signal from an occupancy sensor; and
a second microcontroller input to receive a hardwired ambient light signal from an ambient light sensor;
the single microcontroller having a processor that includes instructions which, when executed by the processor, cause the processor to control at least one of the relay and the first control signal based on at least one of the first input and the second input, the control also based on control rules stored in the processor.

2. The wireless luminaire control device of claim 1, wherein the ambient light signal is a two-position signal.

3. The wireless luminaire control device of claim 1, wherein the ambient light signal is an analog lighting signal.

4. The wireless luminaire control device of claim 1, wherein the processor includes instructions that cause the processor to control the relay and the first control signal.

5. The wireless luminaire control device of claim 4, wherein the processor further includes instructions that cause the processor to control the relay and the first control signal based on the first input and control rules stored in the processor.

6. The wireless luminaire control device of claim 5, wherein the processor further includes instructions that cause the processor to control the relay and the first control signal based on the first input, the second input, and control rules stored in the processor.

7. The wireless luminaire control device of claim 1, wherein the processor retrieves rules from another wireless device by way of the radio and stores those rules on the separate memory device.

8. The wireless luminaire control device of claim 1, wherein the first zero to ten-volt driver interface transmits a zero to ten-volt signal to an LED driver that controls brightness of the luminaire.

9. The wireless luminaire control device of claim 1, wherein the first zero to ten-volt driver interface transmits a zero to ten-volt signal to an LED driver that controls color of the luminaire.

10. The wireless luminaire control device of claim 1, wherein the separate memory device contains instructions for operation of the single microcontroller.

11. The wireless luminaire control device of claim 1, further comprising a hardware switch coupled to the single microcontroller that causes the single microcontroller to execute instructions to join a wireless network when the hardware switch is actuated.

12. The wireless luminaire control device of claim 11, wherein the single microcontroller downloads software through the radio when the hardware switch is actuated.

13. A wireless control device, comprising:
a single microcontroller;
a separate memory device coupled to the single microcontroller, the separate memory device containing instructions for operation of the single microcontroller;
a radio coupled to the single microcontroller for communication with a node on a wireless network;
a relay coupled to the single microcontroller for switching power for a load;
a first microcontroller pulse width modulated output coupled to a first zero to ten-volt driver interface to provide a first control signal for the load;
a second microcontroller pulse width modulated output coupled to a second zero to ten-volt driver interface to provide a second control signal for the load;
a first microcontroller input to receive a first signal from a sensor;
a second microcontroller input to receive a second signal from one of the sensor and a second sensor; and
a hardware switch coupled to the single microcontroller that causes the single microcontroller to execute instructions to join a wireless network when the hardware switch is actuated;
the single microcontroller having a processor that includes instructions which, when executed by the processor, cause the processor to control at least one of the relay and the first control signal based on at least one of the first input and the second input, the control also based on control rules stored in the processor.

14. The wireless luminaire control device of claim 13, wherein the second microcontroller pulse width modulated output coupled to a second zero to ten-volt driver interface provides a light color signal for an LED luminaire.

15. The wireless luminaire control device of claim 13, wherein the first microcontroller pulse width modulated output coupled to a first zero to ten-volt driver interface provides a light intensity signal for a luminaire.

16. A method of controlling a wireless luminaire control device, having a separate memory device, a radio, a relay for switching power to a load, two zero to ten-volt control outputs, a hardware switch, an occupancy input, and an ambient light input with a single microcontroller, comprising:
the separate memory device downloading operational instructions to the single microcontroller when the single microcontroller and separate memory are energized;
the radio receiving a control signal from a remote wireless luminaire control device;
the relay switching to provide hardwired power to a luminaire;
the first zero to ten-volt control output providing a first control signal to be hardwired to the luminaire;
the second zero to ten-volt control output providing a second control signal to be hardwired to the luminaire;
the occupancy input receiving a hardwired occupancy signal from a sensor;
the ambient light input receiving a hardwired ambient light signal from a second the sensor; and
the hardware switch causing the single microcontroller to execute instructions to join a wireless network when the hardware switch is actuated;
the wireless luminaire control device controlling at least one of the relay and the first control signal based on at least one of the occupancy input and the ambient light input, the control also based on control rules stored in the separate memory device and executed by the single microcontroller.

17. The method of controlling a wireless luminaire control device of claim 16, wherein the relay is for switching power to the luminaire and the first zero to ten-volt control output is for controlling one of an intensity and a color of light emitted from the luminaire.

18. The method of controlling a wireless luminaire control device of claim 16, wherein the relay and the first zero to ten-volt control output provide signals to a driver, the driver providing power to an LED luminaire.

19. The method of controlling a wireless luminaire control device of claim 16, wherein the wireless luminaire control device receives a control signal from a manual wall mounted wireless luminaire control device.

20. The method of controlling a wireless luminaire control device of claim 16, wherein the radio receives control rules from a wireless node.

* * * * *